United States Patent
Yang et al.

(10) Patent No.: US 9,769,493 B1
(45) Date of Patent: Sep. 19, 2017

(54) FUSION OF PHASE PLANE CORRELATION AND 3D RECURSIVE MOTION VECTORS

(75) Inventors: Minghui Yang, Shanghai (CN); Guodong Liu, Shanghai (CN); Neil Woodall, Newport Beach, CA (US); Bob Zhang, Santa Clara, CA (US); Qiang Li, Shanghai (CN); Junhua Chen, Shanghai (CN)

(73) Assignee: Pixelworks, Inc., Portland, OR (US)

( * ) Notice: Subject to any disclaimer, the term of this patent is extended or adjusted under 35 U.S.C. 154(b) by 638 days.

(21) Appl. No.: 12/966,847

(22) Filed: Dec. 13, 2010

(51) Int. Cl.
  *H04N 19/13* (2014.01)
  *H04N 19/513* (2014.01)
  *H04N 19/547* (2014.01)
  *H04N 19/56* (2014.01)
  *G06T 7/262* (2017.01)

(52) U.S. Cl.
  CPC .......... *H04N 19/56* (2014.11); *H04N 19/521* (2014.11); *H04N 19/547* (2014.11); *G06T 7/262* (2017.01); *H04N 19/13* (2014.11)

(58) Field of Classification Search
  None
  See application file for complete search history.

(56) References Cited

U.S. PATENT DOCUMENTS

| | | | |
|---|---|---|---|
| 2004/0179594 A1* | 9/2004 | Biswas et al. | 375/240.2 |
| 2008/0204602 A1* | 8/2008 | Beric et al. | 348/699 |
| 2009/0208123 A1* | 8/2009 | Doswald | H04N 19/132 382/236 |
| 2010/0232509 A1* | 9/2010 | Incesu et al. | 375/240.16 |
| 2011/0058610 A1* | 3/2011 | Van Beek | 375/240.16 |

OTHER PUBLICATIONS

Mertens et al., Motion vector field improvement for picture rate conversion with reduced halo, 2001, Proceedings of SPIE vol. 4310 (2001), 352-361.*

* cited by examiner

*Primary Examiner* — Joseph Ustaris
*Assistant Examiner* — William Adrovel
(74) *Attorney, Agent, or Firm* — Marger Johnson (57) ABSTRACT

A system comprises a phase plane correlation (PPC) processing module configured to receive video data from a video source and generate a motion vector (MV) candidate, and a three-dimensional (3D) recursive processing module configured to receive the MV candidate from the PPC processing module, perform 3D recursive processing on a number of MV candidates including the MV candidate received from the PPC processing module, and select one of the MV candidates based on the 3D recursive processing.

20 Claims, 4 Drawing Sheets

FUSION OF PHASE PLANE CORRELATION AND 3D RECURSIVE MOTION VECTORS

TECHNICAL FIELD

The disclosed technology pertains to digital video processing applications, and more particularly to improved techniques for video frame interpolation.

BACKGROUND

Video frame interpolation techniques, which are also referred to as motion compensation techniques, generally involve the determination of motion vectors for changes between subsequent frames received from a video source. These motion vectors can then be used to generate intermediate frames by interpolating the motion of the video between successive video frames received from the video source. Video frames involving certain types of motion, such as object rotation or revolution, can be particularly problematic.

Phase plane correlation (PPC) methods can provide improved motion vectors for successive frames that involve translational motion. PPC methods also offer improved motion vectors in situations where there are changes in scene brightness such as a camera flash, for example. While PPC methods can be used to generate a good initial value of a motion vector for searching methods, these methods tend to be affected by repetitive patterns in the generated motion vectors.

Three-dimensional (3D) recursive methods can provide better motion vectors for non-translational motion with good spatial and temporal MV smoothness, but they have their own shortcomings as well. For example, the convergence of a motion vector using standard 3D recursive methods can vary drastically depending on the time and other factors specific to the situation.

Accordingly, there remains a need for improved motion vector determination in connection with video frame interpolation techniques.

DETAILED DESCRIPTION

Figure 1:
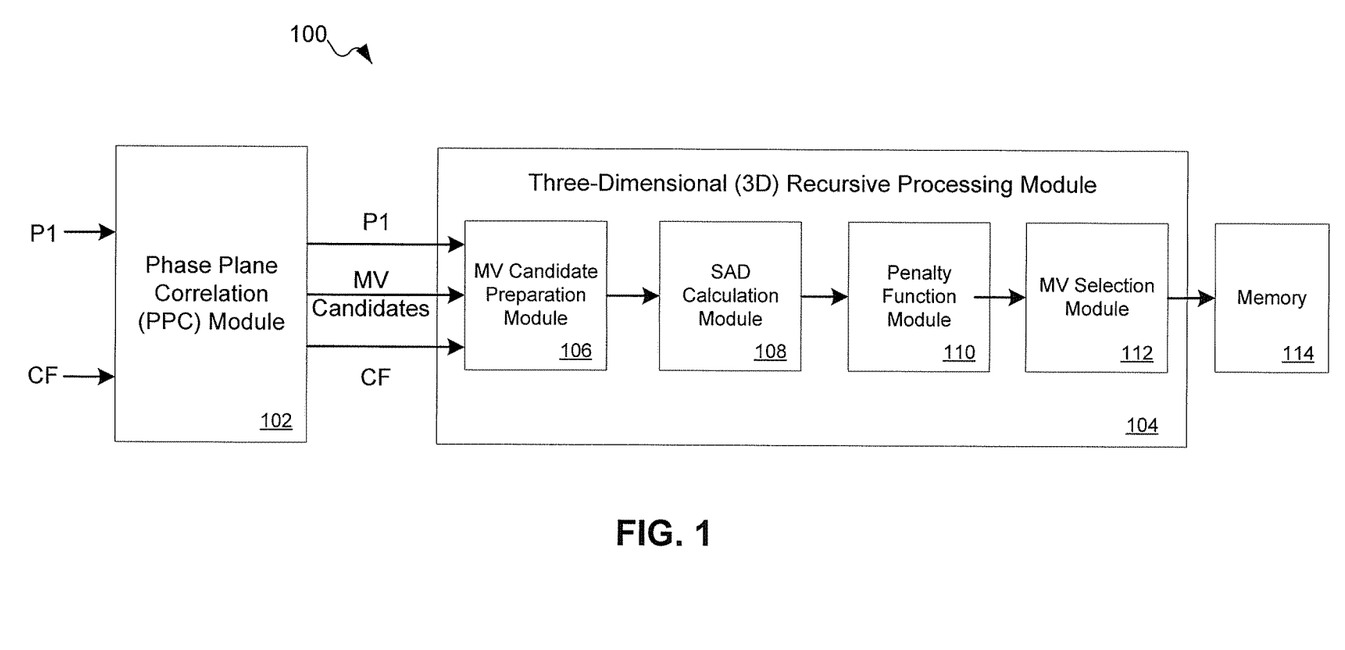
FIG. 1 shows an example of a motion vector (MV) determination system in accordance with embodiments of the disclosed technology.

FIG. 1 illustrates an example of a motion vector (MV) determination system 100 in accordance with embodiments of the disclosed technology. By combining the advantages of phase plane correlation (PPC) and three-dimensional (3D) recursive processing techniques, significantly better motion vectors for interpolation may be obtained than would be obtained using either technique individually.

In the example, the MV determination system 100 includes a PPC module 102 and a 3D recursive processing module 104. The PPC module 102 can generate one or more MV candidates in accordance with the PPC processing techniques described herein and transmit the MV candidates to the 3D recursive processing module 104 for selection.

In the example, the 3D recursive processing module 104 includes a MV candidate preparation module 106, an SAD calculation module 108, a penalty function module 110, and a MV selection module 112. The 3D recursive processing module 104 can process the MV candidates received from the PPC module 102 and adjust the penalties of the MV candidates based on certain conditions in accordance with the techniques described herein. Based on the processing performed by the MV candidate preparation module 106, the SAD calculation module 108, and the penalty function module 110 in accordance with the techniques described herein, the MV selection module 112 may select one or more MVs to be stored in a memory 114 for further processing such as frame interpolation, for example.

As used herein, phase plane correlation (PPC) methods generally refer to a motion estimation technology operating in the frequency domain. These methods typically include measuring translational movement between two successive frames from their phase. Equation 1 demonstrates an example that involves a translational shift between two frames n1 and n2:

$$s(n1,n2,k)=s(n1+d1,n2+d2,k+1) \qquad \text{Eq. 1}$$

The 2-D Fourier transforms f1 and f2 can be determined as shown by Equation 2:

$$S_k(f1,f2)=S_{k+1}(f1,f2)\exp[j2\pi(d1f1+d2f2)] \qquad \text{Eq. 2}$$

The shift in the spatial-domain is reflected as a phase change in the spectrum domain. The Fourier transform of cross-correlation between the two frames is demonstrated by Equation 3:

$$C_{k,k+1}(f1,f2)=S_{k+1}(f1,f2)S_k^*(f1,f2) \qquad \text{Eq. 3}$$

In order to reduce or eliminate the luminance variation influence in the example, the spectrum may be normalized as shown in Equation 4:

$$\Phi[C_{k,k+1}(f1,f2)] = \frac{S_{k-1}(f1,f2)S_k*(f1,f2)}{|S_{k-1}(f1,f2)S_k*(f1,f2)|} \qquad \text{Eq. 4}$$

which yields Equation 5:

$$\Phi[C_{k,k+1}(f1,f2)]=\exp[-j2\pi(f1d1+f2d2)] \qquad \text{Eq. 5}$$

The 2-D inverse transform can be given by Equation 6:

$$C_{k,k-1}(n1,n2)=\delta(n1-d1,n2-d2) \qquad \text{Eq. 6}$$

The estimation of motion relies on the detection of the maximum of this cross-correlation function between two consecutive frames.

We can interpret S(f1, f2) using the following polar coordinates:

$$S_{k+1}(f1,f2)=mag2 \cdot \exp[j \cdot \text{phase2}] \text{ and}$$
$$S_k^*(f1,f2)=mag1 \cdot \exp[-j \cdot \text{phase1}]$$

To convert Equation 4 into Equation 7:

$$\Phi[C_{k,k+1}(f1,f2)]=\exp[j(\text{phase2}-\text{phase1})] \qquad \text{Eq. 7}$$

Accordingly, the phase difference shown in Equation 7 may be used rather then the more complex multiplication and division illustrated in Equation 4. As the coordinates of the phase plane correspond to the motion vector value, a larger PPC processing size will generally correspond to a larger search range of motion vector and, consequently, a higher processing cost.

In certain embodiments, PPC methods are applied to a specified block size between two input frames such as 64×128 pixels, for example. Performing a Discrete Fourier Transform (DFT) on two PPC blocks selected from two consecutive frames (P1 and CF), the DFT function will do periodic extension on the image data. High frequency at the borders tends to greatly affect the PPC results if these two PPC blocks both have a large brightness difference between the first row and the last row (or the first column and the last column). In these cases, 0 MV will be the main peak in the correlation surface. To avoid this high frequency impact, a 2-D window function can be applied on P1 and CF image before performing the DFT. An overlapped block selection can be used to generate the motion vector of a small region based on larger region information.

Consider an example in which there are 2~4 kinds of motion in a specified region. In the phase plane surface, in accordance with Equation 6, for example, an index of the top four peaks with maximum heights is detected to estimate the potential motion in the PPC block. The index will correspond to the horizontal and vertical components of motion at integer-pixel precision between the consecutive frames P1 and CF. Sub-pixel accuracy of motion measurement can be obtained by separable-variable fitting performed in the neighborhood of the top four peaks using two one-dimensional quadratic functions. In these embodiments, there is an assumption that the correlation surface around each peak is a parabolic function or a sinc function.

In certain embodiments, a reliability factor, referred to herein as PPCflag, is generated based on the peak value to denote the motion vector reliability. This reliability is then used to define a PPC penalty function in the motion vector calculation block. The one possible reliability factor is directly quantified by the peak value of correlation surface, as shown by Equation 8:

$$PPC\text{flag}_i = (peak_i * 16)/1024 \quad \text{Eq. 8}$$

Other reliability factors could take into account the sharpness of the peak.

It is often difficult to distinguish a single high peak, i.e., only one dominant motion, with two peaks or two motions, such as foreground and background, in one PPC block. Accordingly, embodiments tend to increase the value of the PPCflag of the single-dominant-peak motion and decrease the value of the PPCflag of multi-dominant-peak motion and no-dominant-peak motion by factoring in the minimal value MIN, around peak, in the correlation phase plane surface, as shown by Equation 9:

$$PPC\text{flag}_i = ((peak_i - \max(0, MIN_i)) * 16)/\max(128, peak_0 + peak_1 + 1) \quad \text{Eq. 9}$$

Following these calculation methods will generally yield the following results:
a) for a pattern having one single-dominant-peak, i.e., where $peak_0 \gg peak_1$, the result is generally about 15;
b) for a pattern having one large peak where $MIN_i$ is also large, the result tends to be small;
c) for a pattern having two large peaks, the result is generally about 8;
d) for a pattern having two small peaks, the result is generally about $$(peak_i - \max(0, MIN_i)) * 16/128$$

Figure 2:
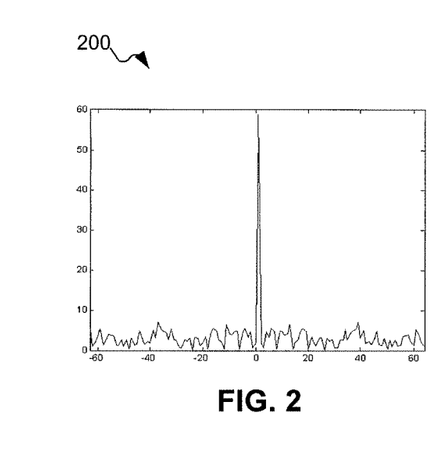
FIG. 2 is a two-dimensional illustration of an example of a number of peak magnitudes for a 1D-FFT having a uniform pattern.
Figure 3:
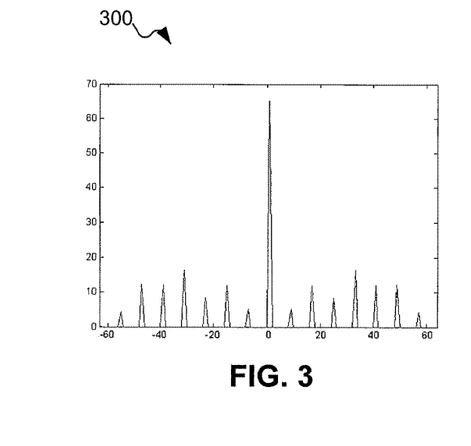
FIG. 3 is a two-dimensional illustration of an example of a number of peak magnitudes for a 1D-FFT having a repetitive pattern.
Figure 4:
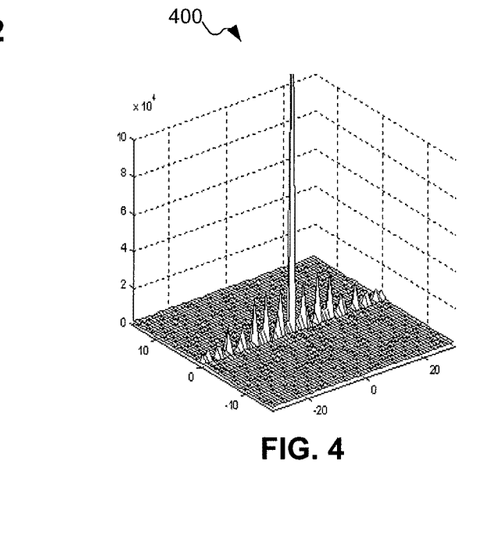
FIG. 4 is a three-dimensional illustration of a number of peak magnitudes for a particular block.

In certain situations where there is a repetitive pattern, PPC methods often get the wrong motion vector (MV) with the above PPCflag. To reduce the effect of these PPC methods in situations where there is a repetitive pattern, repetitive pattern detection logic can be used to detect the repetitive pattern and reduce the reliability of the PPCMV. In the frequency domain, the repetitive pattern will generate obvious period peaks in magnitude surface as illustrated in FIGS. 2-4, where FIG. 2 illustrates a two-dimensional graphical example 200 of peak magnitudes for a 1D-FFT having a uniform pattern, FIG. 3 illustrates a two-dimensional graphical example 300 of peak magnitudes for a 1D-FFT having a repetitive pattern where T=16, and FIG. 4 illustrates a three-dimensional graphical example 400 of peak magnitudes for a particular block.

In situations where there is a repetitive pattern in the PPC blocks both in CF and P1, there are typically some points with high peaks and away from the center peak in the magnitude surface of these two PPC blocks. Certain embodiments involve counting the number of these points in the block and determining whether these blocks represent a repetitive pattern to adjust the PPCflag of the four peaks in the block. In situations where the block has a repetitive pattern, the PPCflag can be reduced by dividing by 2, for example.

In certain embodiments, the calculated motion vectors (MVs) and reliability factor are then sent to an additional selection method, as described below to select a particular motion vector, such as an 8×8-block motion vector, to be sent to a motion compensation algorithm, for example.

In order to obtain improved spatial and temporal smoothness, three-dimensional (3D) recursive methods can be used to refine the results of the PPC processing. As used herein, 3D recursive methods generally refer to techniques for performing a nonlinear estimation of identified 3D motion within a scene taken from a sequence of video frames received from a video source independent of the structure of the scene.

In certain embodiments, several motion vector (MV) candidates are identified. These MV candidates can include spatial candidates, temporal candidates, 0MV, and update MV, as well as the motion vectors from the PPC processing. One or more MVs from neighboring regions can also be used as MV candidates.

Figure 5:
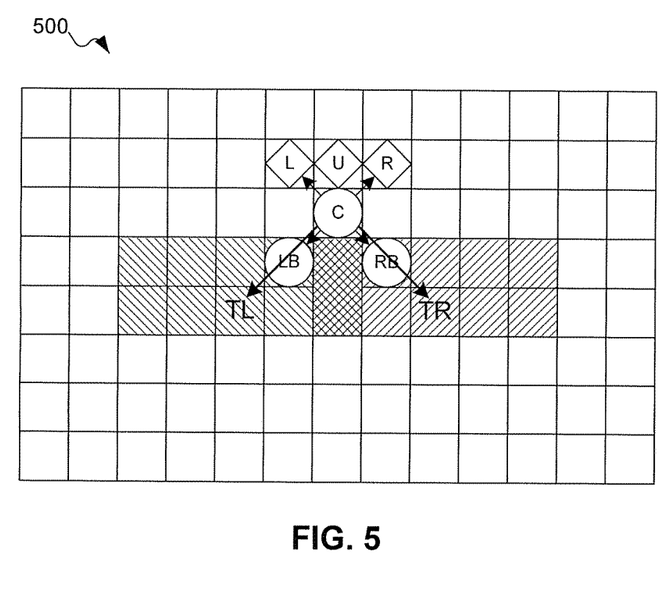
FIG. 5 illustrates a graphical representation 500 of six MV candidates.
Figure 6:
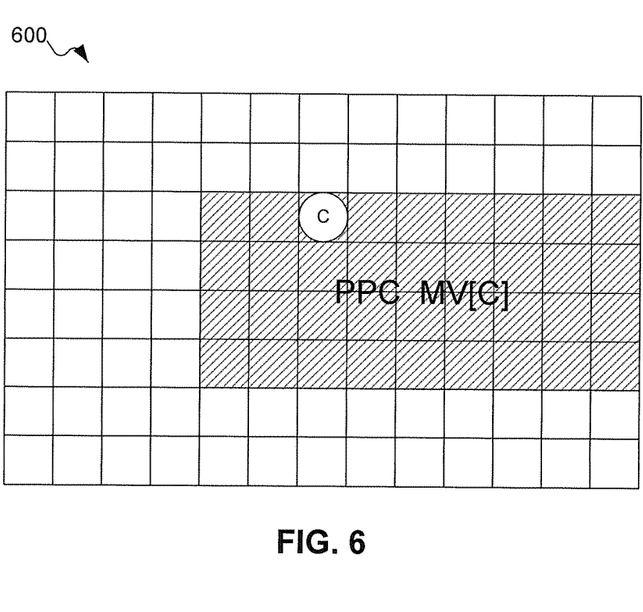
FIG. 6 illustrates a graphical representation 600 of two additional MV candidates that result from PPC processing.

FIGS. 5 and 6 illustrate an example involving eight MV candidates. FIG. 5 illustrates a graphical representation 500 of the following MV candidates, where LB and RB represent block MVs from the previous phase, the three blue diamonds represent block MVs from the current phase, and TL and TR are part from the previous phase:
[0] CurMV[L]
    if (vb<=firstblk) // at image border
        CandiMV[0]=GlbMV.PPCflag>3 ? GlbMV: PreMV[d]
[1] PreMV[TR] from down-right window with min_dist
[2] odd: CandiMV[0]+update; even: 0 MV
[3] CurMV[R]
    if (vb<=firstblk) II at image border
        CandiMV[3]=PreMV[TR]
    else if (CandiMV[0]==CandiMV[3])
        CandiMV[3]=CurMV[U]
[4] PreMV[TL] from down-left window with min_dist
[5] even: CandiMV[3]+update; odd: 0 MV Updated vectors can be generated by way of random number. In the example, PreMV[TL] is the one MV among the TL region that the position which it points to in the current phase is nearest to the current block position. In the example, PreMV[TR] has the same selection criterion.

FIG. 6 illustrates a graphical representation 600 of the remaining two MV candidates in the example:

[6] PPCMV[C], peak 0

[7] PPCMV[C], peak 1

In the example, these candidates are the PPC MV candidates, which reflect the global motion in a large region. Every block in this region shares these two candidates. PPC MV[C] refers to the PPC MV of the PPC block where the current block situates, and peak0 and peak1 refer to the top two peaks.

A Sum of Absolute Difference (SAD) between two frames can be used to denote the similarity of each MV candidate. In a typical 3D recursive method, spatial and temporal smoothness constraints can be used to create penalty functions for each candidate. In present example, the spatial smoothness constraint is primarily used for each candidate as shown in Equation 10, which is presented below, first for k=0 through 2 and then for k=3 through 5 (where k in the equations below refers to the MV Candidate numbers 0 through 7):

For k=0, 1, 2

Penalty[$k$]=(abs($pCandiMV$[$k$].$x$−$pCandiMV$[0].$y$)+ abs($pCandiMV$[$k$].$y$−$pCandiMV$[0].$y$));

For k=3, 4, 5

Penalty[$k$]=(abs($pCandiMV$[$k$].$x$−$pCandiMV$[3].$y$)+ abs($pCandiMV$[$k$].$y$−$pCandiMV$[3].$y$));

For spatial candidates pCandiMV[0] and pCandiMV[3], the penalty is set to be 0; for other MV candidates, the penalty will be very large if there is a large MV difference compared with spatial candidates. Using the spatial smoothness constraint, the motion vector field can be very smooth. Because there may be issues at the object borders, when the background has very large motion, for example, the true MV of the foreground tends to have a large penalty because of a large MV difference.

Given the PPC MV candidate as well as its reliability information, the penalty function of temporal candidates and PPC candidates can be modified as follows. For temporal candidates pCandiMV[1] and pCandiMV[4], the default penalty can be calculated by the spatial smoothness constraint using Equation 10 as presented above. The resulting penalty can then be modified by one of the following two cases.

Case 1: The temporal MV is a large MV and the current PPC block doesn't have a reliable small MV because the PPC MV is typically not accurate when the true MV is large. When there is a reliable small MV, the penalty of the temporal MV should be large.

Flagtemp[0]=max(0,min(4,$pCandiMV$[6].$PPC$flag− $nPPCMinRlbPFG$));

Flagtemp[1]=max(0,min(4,$pCandiMV$[7].$PPC$flag− $nPPCMinRlbPFG$));

In the equation, nPPCMinRlbPFG refers to a register to set the minimal PPCflag value for a reliable PPCMV, and MV1max and MV2max may be calculated as follows:

$MV$1max=max(0,max(abs($pCandiMV$[6].$x$),abs($pCandiMV$[6].$y$))/4−coring);

$MV$2max=max(0,max(abs($pCandiMV$[7].$x$),abs($pCandiMV$[7].$y$))/4−coring);

In the equation, coring refers to a register to set the coring value for the PPCMV's size, and the Flagtemp value can be used to adjust the MV1max and MV2max as follows:

$MV$1max_adj=$MV$1max+(16−4*Flagtemp[0]);

$MV$2max_adj=$MV$2max+(16−4*Flagtemp[1]);

Then, for pCandiMV[1] and pCandiMV[4], MVmax_temporal can be calculated individually in accordance with the following:

$MV$max_temporal[$k$]=max(0,max(abs ($pCandiMV$[$k$].$x$),abs($pCandiMV$[$k$].$y$))/4−coring);// $k$=1 or 4

$Mv$max[$k$]=min($MV$max_temporal[$k$],min ($MV$1max_adj,$MV$2max_adj)*$n$TEMP_$PENK$1/ 4;

In the example, the calculated value Mvmax[k], k=1 or 4, refers to the adjust ratio on the temporal penalty of case 1 for pCandiMV[1] and pCandiMV[4], and nTEMP_PENK1 refers to a register that can be used to tune this ratio.

Case 2: The temporal MV has a similar MV as a reliable PPC block MV, which has a large PPCflag. Because the PPC MV is a global MV in a region and is not very accurate, the temporal MV may be more accurate after the recursive step. The following formulas can be used to calculate the MV distance between the temporal MV and the PPCMV. Here, k is 1 or 4.

Dist3=(abs($pCandiMV$[$k$].$x$−$pCandiMV$[6].$x$)+abs ($pCandiMV$[$k$].$y$−$pCandiMV$[6].$y$));

Dist4=(abs($pCandiMV$[$k$].$x$−$pCandiMV$[7].$x$)+abs ($pCandiMV$[$k$].$y$−$pCandiMV$[7].$y$));

Dist3_ratio[$k$]=max(0,64−dist3*$n$TEMP_ $PENK$2/4)*flagtemp[0]/16;

Dist4_ratio[$k$]=max(0,64−dist4*$n$TEMP_ $PENK$2/4)*flagtemp[1]/16;

Dist_ratio[$k$]=max(Dist3_ratio[$k$],Dist4_ratio[$k$]);

The calculated Dist_ratio[k] refers to the adjusted ratio on the temporal penalty of case 2 for pCandiMV[1] and pCandiMV[4], and nTEMP_PENK2 refers to a register that can be used to tune the ratio. The resulting total penalty of the temporal candidates may be calculated as follows:

Tempcore[$k$]=min(16,max($Mv$max[$k$],Dist_ratio[$k$]));

Penalty[$k$]=Penalty[$k$]*(16−Tempcore[$k$])/16;

Penalty[$k$]=min($n$PPCTEMP_MAXPEN,max ($n$PPCTEMP_MINPEN,penalty[$k$]));

nPPCTEMP_MAXPEN and nPPCTEMP_MINPEN are two registers to adjust the maximal and minimal penalty function for pCandiMV[1] and pCandiMV[4].

For PPC MV candidates pCandiMV[6] and pCandiMV [7], the penalty can be modified by the brightness information and SAD information. When the SAD of spatial candidates is very high or the brightness is different between spatial candidates and PPC candidates, there may actually be two different objects and the spatial smoothness constraint is likely incorrect. The penalty of PPC candidate tends to be smaller.

Dist1=(abs($pCandiMV$[$k$].$x$−$pCandiMV$[0].$y$)+abs ($pCandiMV$[$k$].$y$−$pCandiMV$[0].$y$)); // $k$=6 or 7

Dist2=(abs($pCandiMV$[$k$].$x$−$pCandiMV$[3].$y$)+abs ($pCandiMV$[$k$].$y$−$pCandiMV$[3].$y$)); // $k$=6 or 7

SAD information can be used to adjust the penalty of the PPCMV. A larger SADdiff will generally encourage the PPCMV.

$$SADdiff=\min(SADMaxAdj,\max(0,(\min(pCandiSAD[0],pCandiSAD[3])-pCandiSAD[k])/256-nPPC\text{-}SADCoring));$$

In the example, SADMaxAdj refers to a register that can be used to set the maximal SADdiff adjustment and nPPC-SADCoring refers to the coring function on SADdiff.

Brightness information can also be used to adjust the penalty of PPCMV. A larger brightness difference tends to indicate that the current block is different from the top-left and top-right block and will encourage the PPCMV.

$$Brightdiff1=\min(BriMaxAdj,\max(0,(abs(Bright[k]-Bright[0])-nPPCBrightCoring)/8)+SADdiff)*nPPC\_PENBriK/4;$$

$$Brightdiff2=\min(BriMaxAdj,\max(0,(abs(Bright[k]-Bright[3])-nPPCBrightCoring)/8)+SADdiff)*nPPC\_PENBriK/4;$$

In the example, Bright[k] refers to the average brightness value of pCandiMV[k] and BriMaxAdj refers to a register that can be used to set the maximal Bright difference adjustment. nPPC_PENBriK refers to a register that can be used to tune the brightness adjustment, and nPPCBrightCoring refers to a register that can be used to tune the coring function on the brightness difference.

$$Temp1[k]=dist1*(nPPCPenaltyThr-Brightdiff1-pCandiMV[k].PPCflag)/8;$$

$$Temp2[k]=dist2*(nPPCPenaltyThr-Brightdiff2-pCandiMV[k].PPCflag)/8;$$

In the example, Temp1[k] refers to the modified penalty of pCandiMV[6] or pCandiMV[7] using a spatial constraint and PPC information adjustment, including PPCflag and brightness information, with pCandiMV[0]. Temp2[k] refers to the modified penalty of pCandiMV[6] or pCandiMV[7] using the spatial constraint and PPC information adjustment, including PPCflag and brightness information, with pCandiMV[3]. nPPCPenaltyThr refers to a register that can be used to set a threshold for the adjust ratio.

Accordingly, the Penalty of pCandiMV[6] or pCandiMV[7] can be calculated by way of the following minimum computation:

$$Penalty[k]=\min(Temp1[k],Temp2[k]);$$

The penalty function can be used to adjust the SAD values for each candidate, as shown by the following equation:

$$SAD\_adj[k]=SAD[k]+nPenalty\_gain*Penalty[k]$$

where SAD_adj [k] refers to the modified SAD value for each of the candidates, and where k is from 0 to 7. nPenalty_gain refers to a register that can be used to set the gain value on Penalty[k].

In the MV selection block, the MV candidate having the minimal modified SAD value can be selected. In order to reserve the smoothness of block MVs in neighboring blocks, a median filtering process for block MVs can be performed in 3×3 windows, for example.

In the example, the final block MV of each frame can be stored in memory. In certain embodiments, the stored MV can be subsequently used in connection with a motion compensation algorithm, for example.

Figure 7:
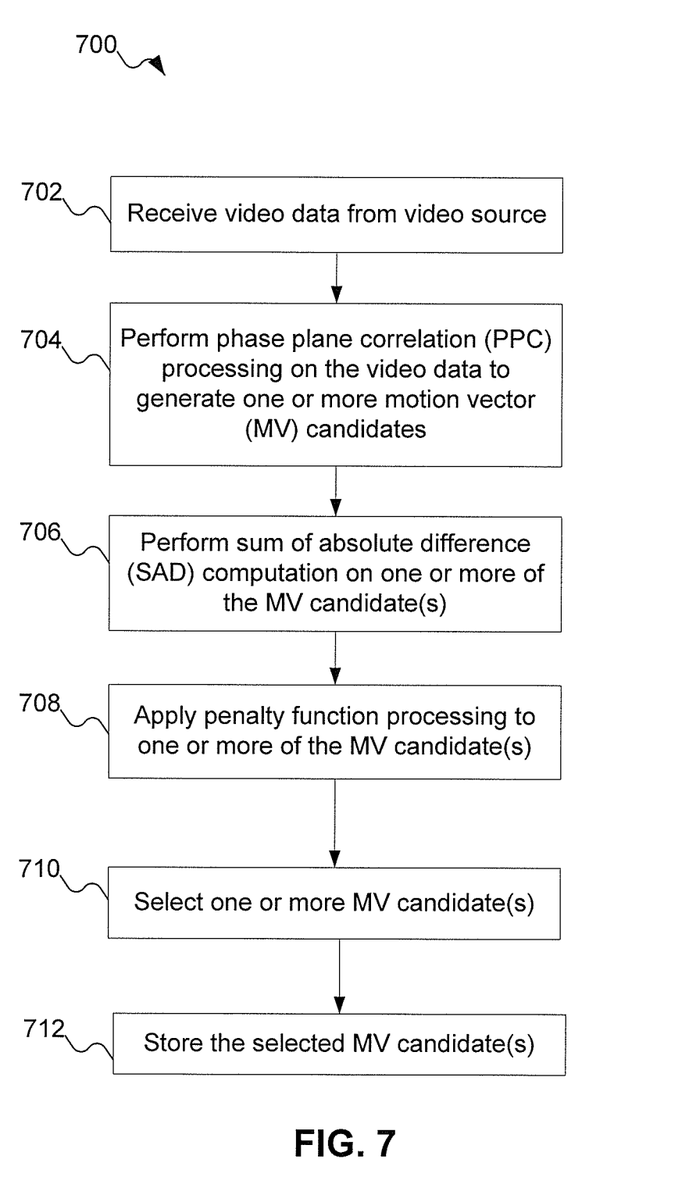
FIG. 7 is a flowchart illustrating an example of a method 700 of determining motion vectors for interpolation in accordance with embodiments of the disclosed technology.

FIG. 7 is a flowchart illustrating an example of a method 700 of determining motion vectors for interpolation in accordance with embodiments of the disclosed technology. At 702, video data such as a series of successive video frames, for example, is received from a video source. At 704, phase plane correlation processing is performed on the received video data to generate one or more motion vector (MV) candidates for three-dimensional (3D) recursive processing techniques.

At 706, a Sum of Absolute Difference (SAD) is performed on at least one of the MV candidates. Penalty function processing in accordance with the techniques described herein is then applied to the MV candidates, as shown at 708. Based on the SAD and penalty function processing, one or more of the MV candidates is selected, as shown at 710. The selected MV can be stored in memory, as shown at 712, for further processing such as frame interpolation. In certain embodiments, a block MV for each video frame in the video data may be selected and stored in memory.

The following discussion is intended to provide a brief, general description of a suitable machine (e.g., projector system) in which embodiments of the disclosed technology can be implemented. Typically, the machine includes a system bus to which are attached processors, memory (e.g., random access memory (RAM), read-only memory (ROM), or other state preserving medium), storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits (ASICs), embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Embodiments of the disclosed technology may be described by reference to or in conjunction with associated data including functions; procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other tangible storage devices and non-transitory storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the disclosed technology with reference to described embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the disclosed technology" or the like are used herein, these phrases are meant to generally reference embodiment possibilities, and are not intended to limit the invention to any particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
a phase plane correlation (PPC) processing module configured to: receive video data from a video source, generate at least one motion vector (MV) candidate for a three-dimensional (3D) recursive frame interpolation method using a PPC method, and determine a reliability factor corresponding to the MV candidate(s); and
a three-dimensional (3D) recursive processing module configured to:
receive the at least one MV candidate and corresponding reliability factor from the PPC processing module;
perform 3D recursive processing on a plurality of MV candidates comprising the at least one MV candidate received from the PPC processing module and at least one MV candidate from a neighboring region;
adjust the 3D recursive processing based on the reliability factor, where adjusting the 3D recursive processing includes the reliability factor adjusting the processing for the at least one MV candidate received from the PPC processing module differently than MV candidates from spatial and temporal candidate blocks; and
based on the 3D recursive processing, select at least one of the plurality of MV candidates.

2. The system of claim 1, further comprising a memory configured to store the selected at least one of the plurality of MV candidates.

3. The system of claim 1, further comprising a frame interpolation module configured to perform video frame interpolation on the selected at least one of the plurality of MV candidates.

4. The system of claim 1, wherein the PPC processing module is configured to generate the at least one MV candidate by performing a PPC operation on the video data received from the video source.

5. The system of claim 1, wherein the 3D recursive processing module comprises a Sum of Absolute Difference (SAD) processing module configured to perform SAD processing on the plurality of MV candidates.

6. The system of claim 5, wherein the 3D recursive processing module further comprises a penalty function processing module configured to determine a penalty value for each of the plurality of MV candidates.

7. The system of claim 6, wherein the 3D recursive processing module further comprises a MV selection module configured to select at least one of the plurality of MV candidates based at least in part on the SAD processing and the determined penalty value for each of the plurality of MV candidates.

8. The system of claim 6, wherein the penalty function processing module is further configured to adjust the penalty value for each of the plurality of MV candidates based at least in part on brightness information corresponding to the MV candidates.

9. The system of claim 1, wherein the reliability factor corresponds to the peak value of the correlation surface as well as the sharpness of the peak.

10. A method, comprising:
receiving video data from a video source;
generating one or more motion vector (MV) candidates by performing phase plane correlation (PPC) processing on the received video data;
determining a reliability factor corresponding to the MV candidate(s);
a processor performing three-dimensional (3D) recursive processing on a plurality of MV candidates comprising the generated one or more MV candidates and at least one MV candidate from a neighboring region, and adjusting the 3D recursive processing based on the reliability factor, where adjusting the 3D recursive processing includes the reliability factor adjusting the processing for the generated one or more MV candidates differently than MV candidates from spatial and temporal candidate blocks; and
selecting at least one of the plurality of MV candidates based on results of the 3D recursive processing.

11. The method of claim 10, further comprising storing the selected at least one of the plurality of MV candidates in memory.

12. The method of claim 10, further comprising performing frame interpolation on the video data based on the selected at least one of the plurality of MV candidates.

13. The method of claim 10, wherein performing 3D recursive processing comprises performing SAD processing on the plurality of MV candidates.

14. The method of claim 13, wherein performing 3D recursive processing further comprises performing penalty function processing on the plurality of MV candidates to determine a penalty value for each of the plurality of MV candidates.

15. The method of claim 14, wherein the selecting is based at least in part on at least one of the SAD processing and the penalty function processing.

16. The method of claim 14, wherein performing 3D recursive processing further comprises using each penalty value to adjust a SAD value determined for each MV candidate.

17. The method of claim 16, wherein the selecting comprises determining which of the plurality of MV candidates has the lowest adjusted SAD value.

18. The method of claim 14, further comprising adjusting the penalty value for each of the plurality of MV candidates based at least in part on brightness information corresponding to the MV candidates.

19. The method of claim 10, wherein the reliability factor corresponds to the peak value of the correlation surface as well as the sharpness of the peak.

20. An article comprising a non-transitory, computer-readable media storing computer-executable instructions that, when executed by a processor, perform a method, comprising:
receiving video data from a video source;
generating one or more motion vector (MV) candidates by performing phase plane correlation (PPC) processing on the received video data;

determining a reliability factor corresponding to the MV candidate(s);

the processor performing three-dimensional (3D) recursive processing on a plurality of MV candidates comprising the generated one or more MV candidates and at least one MV candidate from a neighboring region, and adjusting the 3D recursive processing based on the reliability factor, where adjusting the 3D recursive processing includes the reliability factor adjusting the processing for the one or more generated MV candidates differently than MV candidates from spatial and temporal candidate blocks; and selecting at least one of the plurality of MV candidates based on results of the 3D recursive processing.

* * * * *